June 11, 1929.    T. E. KIRKPATRICK    1,716,922
STEAM COOKER
Filed May 31, 1927
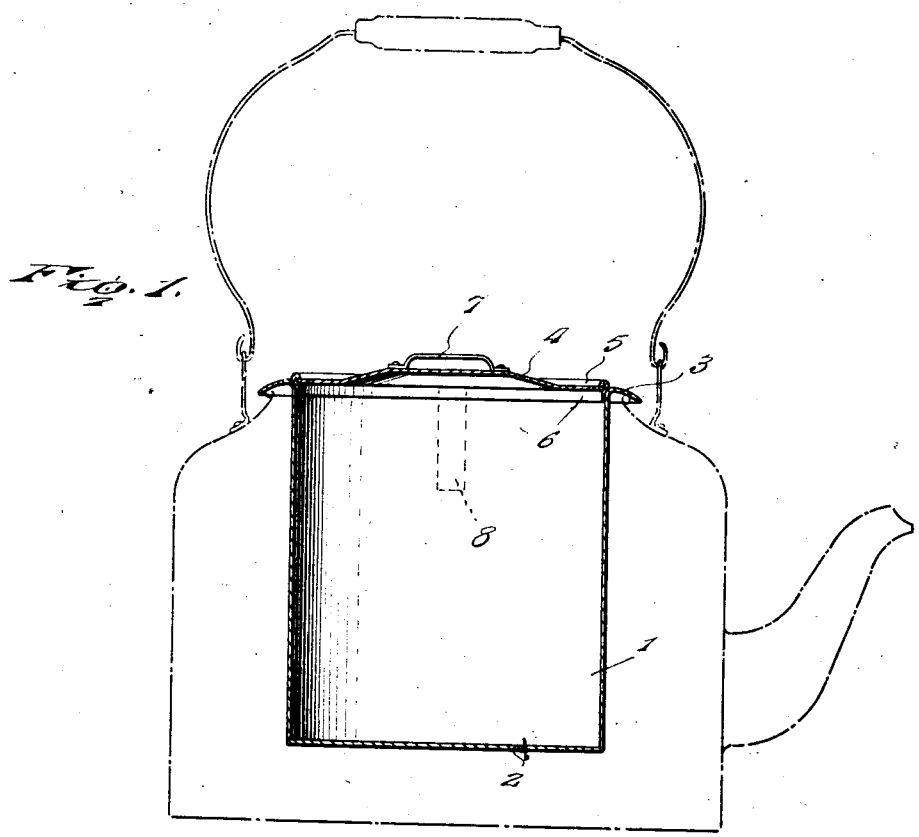
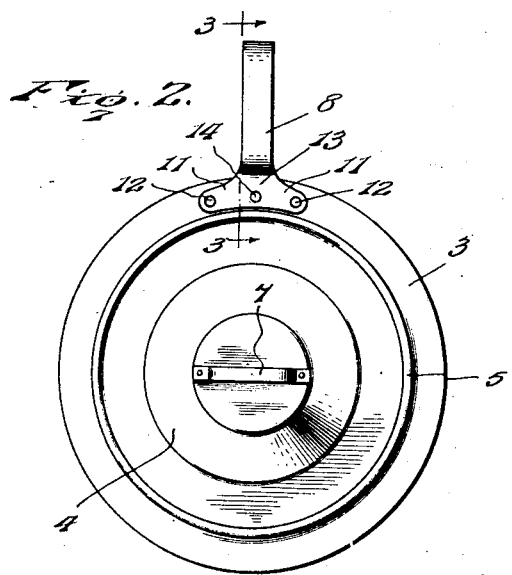
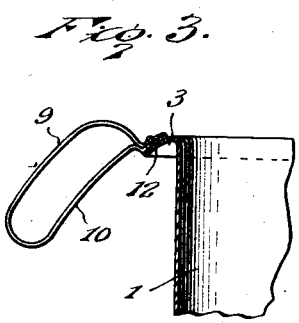
Inventor
T. E. Kirkpatrick
By Lacey & Lacey, Attorney Patented June 11, 1929.

1,716,922

UNITED STATES PATENT OFFICE.

THOMAS E. KIRKPATRICK, OF LAKE WORTH, FLORIDA.

STEAM COOKER.

Application filed May 31, 1927. Serial No. 195,457.

This invention relates to cooking utensils and more particularly to a steam cooker in which cereal and other materials which burn easily may be cooked.

One object of the invention is to provide a receptacle of the character described which may be set into a tea kettle of a conventional construction and fit tea kettles having filling openings of different sizes. At the present time double boilers are in use in which the food receptacle is placed in a tea kettle which serves as a water receptacle and may also be employed as an ordinary tea kettle but the food receptacle will only fit the tea kettle for which it is made and, therefore, when the tea kettle wears out a new one having a filling opening of the same size must be purchased or the food receptacle will not fit properly therein.

Another object of the invention is to provide the food receptacle with an outstanding flange which is so formed in cross section that when the food receptacle is inserted into a tea kettle the outstanding flange may rest upon the tea kettle and properly center itself in the filling opening of the tea kettle. Therefore, the food receptacle may be properly supported and retained in substantially a vertical position.

Another object of the invention is to provide the food receptacle with a handle so formed that it extends downwardly and outwardly therefrom and will be disposed close to the walls of the tea kettle where it will be out of the way but at the same time may be easily grasped when it is desired to lift the food receptacle from the tea kettle.

Another object of the invention is to provide the food receptacle with a cover for its open upper end which may be easily set in place or removed and when in place will have tight gripping engagement with the walls of the receptacle.

The invention is illustrated in the accompanying drawing, wherein

Figure 1 is a view showing the food receptacle in vertical section and disposed in a tea kettle indicated by dotted lines;

Fig. 2 is a top plan view of the food receptacle;

Fig. 3 is a sectional view taken on the line 3—3 of Fig. 2 with the handle of the receptacle shown in side elevation and a portion of the receptacle in vertical section.

The steam cooker constituting the subject-matter of this invention consists of a receptacle 1 having a bottom 2 and having the upper end portions of its walls rolled outwardly to form a suspending flange 3 which projects radially from the walls at the open upper end of the receptacle and in cross section is curved downwardly. This is clearly shown in Figs. 1 and 3, and referring particularly to Fig. 1 it will be seen that when the receptacle is inserted into a tea kettle through the filling opening thereof the suspending flange will rest upon the tea kettle about its filling opening and the receptacle will be suspended in a vertical position. It will also be noted that the receptacle may be received in tea kettles having filling openings of different sizes and, therefore, it is not necessary to obtain a tea kettle having an opening of a particular size if the tea kettle with which the cooker is being used should become worn out.

The cover 4 of the receptacle 1 is formed of sheet metal and has its marginal portions bent to provide an upstanding bead 5 from which extends a depending flange 6. The depending flange 6 fits into the receptacle in engagement with the walls thereof and this provides a tight joint between the cover and the walls of the receptacle. It should also be noted that the bead 5 prevents the cover from being forced too far into the receptacle when set in place. A handle 7 is carried by the cover so that it may be easily removed or set in place.

In order to hold the receptacle while setting it into a tea kettle or removing it therefrom, there has been provided a handle 8 which is formed from a strip of sheet metal bent intermediate its length to provide upper and lower arms 9 and 10. If desired, these arms may be referred to as outer and inner arms. The free end portion of the arm 10 overlaps the outstanding flange 3 and is formed with side extensions 11 through which rivets or the like 12 are passed in order to firmly secure the handle to the flange and the arm 9 has its free end portion extended downwardly until it contacts with the arm 10 and is then bent to form a foot 13 which rests upon the free end portion of the arm 10 and is secured by a rivet 14 which, if desired, may be passed through the flange 3 and constitute additional means to secure the handle to the flange. By referring to Fig. 3, it will be seen that the handle consists of an elongated loop which extends outwardly and downwardly from the flange so that it will be disposed to the tea kettle where it will be out of the way. At the same time the handle may be easily grasped when it is desired to lift the receptacle from the tea kettle.

When in use, the kettle is partially filled with water and cereal or the like to be cooked or reheated is placed in the receptacle 1. When the receptacle is set into the kettle, it is practically entirely disposed within the kettle and its walls heated by the hot water and steam in the kettle for substantially the full depth of the receptacle. The water in the kettle may be used to wash dishes or for cooking purposes. This saves time and fuel as well as eliminating a special water container for use only with a food receptacle of a double boiler. If desired, a knob may be substituted for the handle 7 and the handle 8 may be strengthened by a rolled side edge or a longitudinally extending rib intermediate its width.

Having thus described the invention, I claim:

1. A receptacle of the character described open at its top and having a bottom and walls, a circumferentially extending suspending flange projecting outwardly from the walls of said receptacle and sloping downwardly toward its outer edge in cross section, and adapted to suspend the receptacle within an outer vessel, a handle carried by said flange radially thereof and extending outwardly therefrom at a downward incline for disposition close to the outer vessel when the receptacle is suspended therein, said handle consisting of an elongated loop disposed in a vertical plane, substantially below the top of the receptacle and attaching means at the upper end of said loop secured to the flange.

2. A receptacle of the character described open at its top and having a bottom and walls, a circumferentially extending suspending flange projecting outwardly from the walls of said receptacle and sloping downwardly toward its outer edge in cross section, and adapted to suspend the receptacle within an outer vessel and a handle carried by said flange radially thereof and extending outwardly therefrom at a downward incline for disposition close to the outer vessel when the receptacle is suspended therein, said handle being substantially below the upper end of the receptacle and consisting of a strip bent intermediate its ends to form upper and lower arms having their upper ends disposed one upon the other and secured upon said flange.

3. A receptacle of the character described open at its top and having a bottom and walls, a circumferentially extending suspending flange projecting outwardly from the walls of said receptacle and sloping downwardly toward its outer edge in cross section and adapted to suspend the receptacle within an outer vessel, and a handle carried by said flange radially thereof and extending outwardly therefrom at a downward incline for disposition close to the outer vessel when the receptacle is suspended therein, said handle being substantially below the upper end of the receptacle and consisting of a strip bent intermediate its ends to form upper and lower arms having their ends disposed one upon the other and one having side extensions projecting transversely from the other and secured upon the flange.

In testimony whereof I affix my signature.

THOMAS E. KIRKPATRICK. [L. S.]